No. 756,874. PATENTED APR. 12, 1904.
W. E. METZEL.
LOCK.
APPLICATION FILED SEPT. 2, 1903.
NO MODEL.
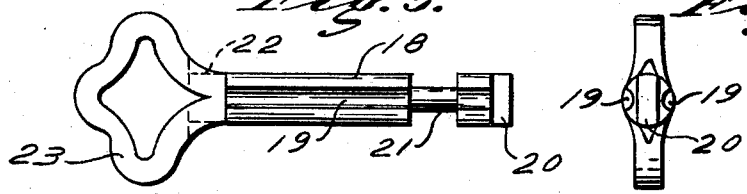
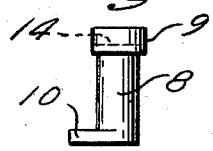
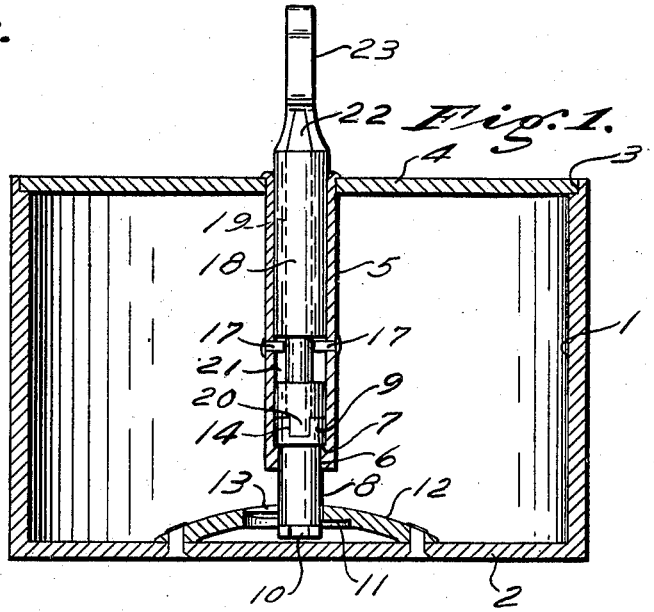
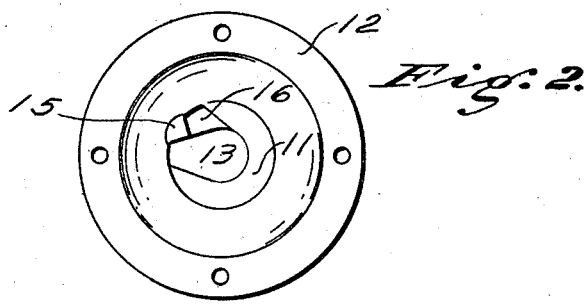
Witnesses: Inventor,
William E. Metzel,
by Kummler & Kummler,
Attorneys.

No. 756,874. Patented April 12, 1904.

UNITED STATES PATENT OFFICE.

WILLIAM E. METZEL, OF CHICAGO, ILLINOIS, ASSIGNOR TO EDMONDS-METZEL MANUFACTURING COMPANY, OF CHICAGO, ILLINOIS.

LOCK.

SPECIFICATION forming part of Letters Patent No. 756,874, dated April 12, 1904.

Application filed September 2, 1903. Serial No. 171,590. (No model.)

*To all whom it may concern:*

Be it known that I, WILLIAM E. METZEL, a citizen of the United States of America, and a resident of Chicago, in the county of Cook and State of Illinois, have invented certain new and useful Improvements in Locks, of which the following is a specification.

The main objects of my invention are to provide in a device having locking means located within a tubular passage suitable obstacles adapted to prevent tampering with said locking means and to provide an inexpensive form of key adapted to pass such obstacles and operate the locking means.

My invention is particularly intended for use in locks for small receptacles—as, for instance, home savings-banks.

I accomplish these objects by the device shown in the accompanying drawings, in which—

Figure 1 is a vertical section of a cylindrical savings-bank having a locking-tube and key constructed according to my invention. Fig. 2 is a bottom plan of the cam which forms part of the locking means shown in Fig. 1. Figs. 3 and 4 are respectively side elevations and bottom plan of the locking-dog. Figs. 5 and 6 are elevations showing a key constructed according to my invention.

The device shown consists of a receptacle open at one end and having cylindrical side walls 1 integral with the bottom 2 and recessed at 3 at their upper end to receive the cover 4. A tube 5 extends through the center of the circular cover 4 and is disposed concentrically of the axis of the walls 1 of the receptacle. The opening 6 at the lower end of the tube 5 is contracted to form the inner annular shoulder 7. A dog 8 is seated in the opening 6 and is provided with an enlarged head 9, which bears against the shoulder 7 to prevent the dog from being pulled downwardly out of the tube 5, but permitting a free rotation of the dog. The dog 8 is further provided with a projecting lug 10, which is adapted to engage a cam-surface 11 on the cam-plate 12, which is rigidly secured to the bottom of the receptacle 2. The cam-plate is provided with a central aperture 13 for receiving the lower end of the dog 8 and the shoulder 10. The cam-surface 11 is spiral and extends around the edge of the aperture 13 on the lower side of the cam-plate 12. The head of the dog is slotted at 14. The shank of the dog is of suitable length to permit the lug 10 to engage the highest part of the cam-surface 11 when the cover is in its normal position in the recess 3. The cover 4 is preferably made of resilient material, so that it will yield sufficiently to permit the lug 10 of the dog to follow the cam-surface 11 when the dog is rotated. The cam-surface 11 is provided with a stop 15 for limiting the rotation of the lug 10 and with a recess 16, into which the lug 10 becomes seated when the dog is in its locking position. The tube or keyway 5 is preferably provided with inwardly-projecting shoulders 17, which may be arranged in any desired disposition to serve as obstacles for preventing tampering with the locking means at the lower end of the tube.

The locking means above described consisting of the cam-plate 12 and the coacting parts are not a part of my invention, but constitute the subject-matter of the copending application of Jay. D. Edmonds, filed September 2, 1903, Serial No. 171,592, and are shown merely to illustrate the operation of my device.

The shank 18 of the key is preferably made of grooved wire of a diameter fitting the interior of the tube 5 and which may have longitudinal grooves 19 rolled therein to correspond with the location of the shoulders 17 within the tube. The lower end 20 of the key is then formed to fit the head 9 of the dog, and one or more grooves 21 are cut around the shank transversely of its length. These correspond in location to the distance of the shoulder 17 above the dog 8. The other end 22 of the key is preferably flattened and fitted into a saw-cut in the handle 23, being secured therein by means of solder. The groove 21 is of sufficient width to permit the rotation of the key after same has been inserted into a tube 5, so that the end 20 of the key may be turned to suitable position to mesh with the reciprocally-formed head of the dog.

In operation the cover 4 is seated in the recess 3 at the upper end of the walls 1, with the tube extending inwardly of the receptacle. The shank 18 of the key is inserted into the tube, the shoulder 17 registering with the grooves 19. The key is now pushed inwardly and turned until its end 20 meshes with the head 9 of the dog. Continued downward pressure and turning of the key will cause the lug 10 of the dog to register with the aperture 13 in the cam-plate and enter same. Right-handed rotation of the key will now cause the lug 10 to move along the cam-surface 11 until it becomes seated in the recess 16. Further right-handed rotation is at this point prevented by the stop 15. The action of the lug 10 on the cam-surface 11 tends to draw the cover downwardly tightly upon its seat and springs the cover inwardly, so that the resilient reaction of the cover tends to draw the lug 10 tightly into the recess 16.

It will be seen that some of the details of my invention may be altered without departing from the spirit of my invention. I therefore do not limit myself to such details except as hereinafter limited in the claim.

What I claim as my invention, and desire to secure by Letters Patent, is—

In a device of the class described, the combination of a tubular keyway having a shoulder projecting into same; and a key having a substantially cylindrical shank fitting said keyway and having a longitudinal groove extending along the shank and having a transverse groove extending around the shank at right angles to the longitudinal groove, said grooves being of suitable size and suitably located to receive said shoulder and control the rotation of said key, substantially as described.

Signed at Chicago this 28th day of August, 1903.

WILLIAM E. METZEL.

Witnesses:
 RUDOW RUMMLER,
 WM. R. RUMMLER.